United States Patent
Alhothaily et al.

(10) Patent No.: US 10,193,895 B2
(45) Date of Patent: Jan. 29, 2019

(54) SYSTEM AND METHOD FOR REMOTE AUTHENTICATION WITH DYNAMIC USERNAMES

(71) Applicants: Abdulrahman Alhothaily, Washington, DC (US); Arwa Alrawais, Washington, DC (US)

(72) Inventors: Abdulrahman Alhothaily, Washington, DC (US); Arwa Alrawais, Washington, DC (US)

(*) Notice: Subject to any disclaimer, the term of this patent is extended or adjusted under 35 U.S.C. 154(b) by 260 days.

(21) Appl. No.: 15/353,183

(22) Filed: Nov. 16, 2016

(65) Prior Publication Data
US 2017/0339163 A1    Nov. 23, 2017

Related U.S. Application Data

(60) Provisional application No. 62/338,037, filed on May 18, 2016.

(51) Int. Cl.
| | | |
|---|---|---|
| *H04L 29/06* | (2006.01) | |
| *H04W 12/06* | (2009.01) | |
| *H04W 12/08* | (2009.01) | |

(52) U.S. Cl.
CPC ........ *H04L 63/108* (2013.01); *H04L 63/0428* (2013.01); *H04L 63/0807* (2013.01); *H04L 63/101* (2013.01); *H04W 12/06* (2013.01); *H04W 12/08* (2013.01); *H04L 63/0414* (2013.01); *H04L 63/062* (2013.01); *H04L 63/067* (2013.01); *H04L 63/0853* (2013.01); *H04L 2463/062* (2013.01)

(58) Field of Classification Search
CPC .................................................... H04L 63/108
USPC ............................................................. 726/4
See application file for complete search history.

(56) References Cited

U.S. PATENT DOCUMENTS

| | | | |
|---|---|---|---|
| 8,584,224 B1* | 11/2013 | Pei ........................ | H04L 9/3213 |
| | | | 713/168 |
| 8,914,851 B2 | 12/2014 | Fakhrai et al. | |
| 9,369,464 B2* | 6/2016 | Philipsz .............. | H04L 63/0853 |
| 9,613,250 B2* | 4/2017 | Karame .................. | G06F 21/32 |
| 2005/0114680 A1 | 5/2005 | Chinnaswamy et al. | |
| 2007/0033642 A1* | 2/2007 | Ganesan et al. .... | H04L 63/0428 |
| | | | 726/10 |

(Continued)

OTHER PUBLICATIONS

D. Zhao, et al., "An efficient dynamic ID based remote user authentication scheme using self-certified public keys for multi-server environment" http://arxiv.org/pdf/1305.6350.pdf, May 28, 2013, pp. 1-22.

*Primary Examiner* — Harris C Wang
(74) *Attorney, Agent, or Firm* — Oblon, McClelland, Maier & Neustadt, L.L.P.

(57) ABSTRACT

A method and apparatus for authenticating a user for access to a service provider over a network is disclosed. It includes a first device configured to receive a request for a ticket, generate the ticket, send the ticket to at least one additional device, generate a first partial signature of the ticket, receive additional partial signatures of the ticket, generate a complete signature of the ticket, encrypt the ticket and the complete signature of the ticket, send the encrypted ticket and encrypted complete signature of the ticket to the service provider, receive an encrypted verification code from the service provider, decrypt the encrypted verification code, and display the decrypted verification code.

20 Claims, 9 Drawing Sheets

(56) References Cited

U.S. PATENT DOCUMENTS

| | | |
|---|---|---|
| 2010/0122091 A1 | 5/2010 | Huang et al. |
| 2013/0254544 A1* | 9/2013 | Hjelm .................... H04L 9/085 |
| | | 713/171 |
| 2015/0229480 A1* | 8/2015 | Joye ....................... H04L 9/008 |
| | | 713/176 |
| 2015/0262164 A1* | 9/2015 | Ranganathan ..... G06Q 20/3278 |
| | | 705/39 |
| 2016/0065370 A1 | 3/2016 | Le Saint et al. |
| 2017/0149570 A1* | 5/2017 | Counterman ....... H04L 63/0876 |
| 2017/0339163 A1* | 11/2017 | Alhothaily ........... H04L 63/108 |

* cited by examiner

SYSTEM AND METHOD FOR REMOTE AUTHENTICATION WITH DYNAMIC USERNAMES

CROSS-REFERENCE TO RELATED APPLICATIONS

This application claims the benefit of U.S. provisional application 62/338,037, filed May 18, 2016, which is hereby incorporated by reference in its entirety.

GRANT OF NON-EXCLUSIVE RIGHT

This application was prepared with financial support from the Saudi Arabian Cultural Mission, and in consideration therefore the present inventors have granted The Kingdom of Saudi Arabia a non-exclusive right to practice the present invention.

TECHNICAL FIELD

This disclosure relates generally to a system and method for enhancing security for remote user authentication. More specifically, it relates to a system and method for ensuring the security and integrity of remote authentication using dynamic (one-time) usernames.

BACKGROUND

Traditional remote user authentication schemes, such as username and password, pose a serious threat to the security of users and providers of online services such as retail, financial, and the like. Most current authentication systems assign or allow users to choose a unique username that may be used for an extended period of time. In addition, users tend to employ the same username and, in many cases, the same password for many different websites, online accounts, and systems.

SUMMARY

A method and apparatus for authenticating a user for access to a service provider over a network is disclosed. In some embodiments, a first device for authenticating a user for access to a service provider over a network includes circuitry configured to receive a request for a ticket and generate the ticket, where the ticket includes a one-time username. The first device then sends the ticket to at least one additional device, generates a first partial signature of the ticket, and receives at least one additional partial signature of the ticket from each of the at least one additional device. The first device then generates a complete signature of the ticket based on the first partial signature and the at least one additional partial signature of the ticket, encrypts the ticket and the complete signature of the ticket, sends the encrypted ticket and encrypted complete signature of the ticket to the service provider, receives an encrypted verification code from the service provider, decrypts the encrypted verification code, and displays the decrypted verification code.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

It is well known that the typical form of remote authentication of a user of online services (banking, retail, social networking, etc.), a combination of a username and a password, is insecure and vulnerable to many forms of attack. In many recent data breaches, attackers were able to gain access to a website server or host computer by using stolen user credentials.

Another serious issue with the conventional username and password scheme is the large number of usernames and passwords users may need to manage for the many online services to which they subscribe. The growth of online banking, commerce, and government services has led to a significant increase in the number of credentials handled by users. It has been reported that active web users may manage an average of 24 passwords on a daily basis. Unfortunately, many users use the same username and/or password to protect multiple accounts. But users are poorly equipped, at a cognitive level, to deal with multiple usernames and long passwords, thus leading to credentials reuse on different accounts and systems. And writing username and passwords down or choosing passwords that are easy to remember reduces the protection offered by traditional authentication schemes.

Referring now to the drawings, wherein like reference numerals designate identical or corresponding parts throughout the several views.

Figure 1:
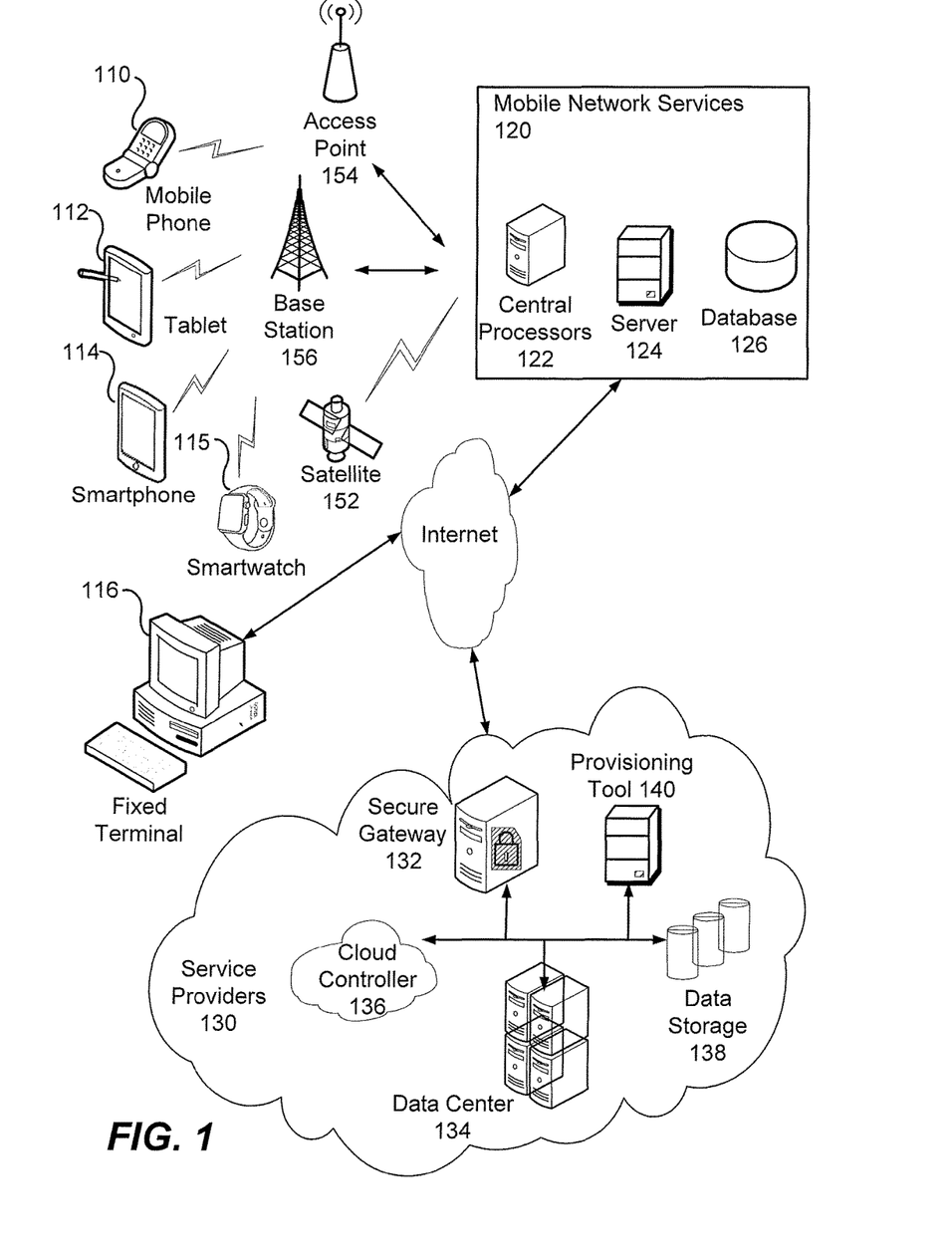
FIG. 1 illustrates an overall system view wherein a remote user authentication system as disclosed herein may be employed.

FIG. 1 illustrates an overall system view wherein a remote user authentication system and method, as disclosed herein, may be employed to authenticate a user wishing to access a remote service provider (bank, retail, government, or social network website, for example) through a mobile device or fixed terminal (personal computer, or the like) that is connected to the Internet. The disclosed system and method may provide enhanced security for users and service providers against phishing attacks, keystroke logging, social engineering, password-related attacks, shoulder-surfing attacks, replay attacks, and the like. The mobile devices may include mobile phone 110, tablet 112, smartphone 114, and smartwatch 115, for example. The mobile devices may connect to a mobile network service 120 through a wireless channel provided by, for example, base station 156 (e.g., an Edge, 3G, 4G, or LTE Network), access point 154 (e.g., a femto cell or WiFi network), or satellite connection 152. In some implementations, one mobile device may connect through another mobile device. For example, smartwatch 115 may connect to base station 156 through smartphone 114. In one implementation, signals from the wireless interface to the mobile devices (e.g., the base station 156, the access point 154, and the satellite connection 152) are transmitted to a mobile network service 120, such as an EnodeB and radio network controller, UMTS, or HSDPA/HSUPA. Mobile user requests and information may be transmitted to central processors 122 that are connected to server 124 providing mobile network services, for example. Further, mobile network operators may provide service to mobile users such as authentication, authorization, and accounting based on home agent and subscribers' data stored in database 126, for example. After that, the subscribers' requests are delivered to one or more service providers 130 through the Internet.

A user may also access service providers 130 through a fixed terminal 116, such as a desktop or laptop personal computer or workstation that is connected to the Internet via a wired or wireless network connection. The network may be a public or a private network such as a LAN or WAN network. The network may be wireless such as a cellular network including EDGE, 3G, 4G, and LTE wireless cellular systems. The wireless network can also be Wi-Fi, Bluetooth, or any other wireless form of communication that is known.

The user terminal, such as a mobile device or fixed user terminal, provides to the user a mechanism to connect via the Internet to service providers 130. Service providers 130 may be part of a cloud computing service, in which case a cloud controller 136 may process requests to provide a user with appropriate services. These services may be provided using the concepts of utility computing, virtualization, and service-oriented architecture.

In one implementation, the service providers 130 may be accessed via an interface such as a secure gateway 132. The secure gateway 132 may, for example, provide security policy enforcement points placed between service consumers and service providers to interject enterprise security policies as the resources are accessed. Further, the secure gateway 132 may consolidate multiple types of security policy enforcement, including, for example, authentication, single sign-on, authorization, security token mapping, encryption, tokenization, logging, alerting, and API control. The service providers 130 may provide, to users, computational resources using a system of virtualization, wherein processing and memory requirements can be dynamically allocated and dispersed among a combination of processors and memories to create a virtual machine that is more efficient at utilizing available resources. Virtualization may create an appearance of using a single seamless computer even though multiple computational resources and memories can be utilized according increases or decreases in demand. In one implementation, virtualization may be achieved using a provisioning tool 140 that prepares and equips the provider resources such as the processing center 134 and data storage 138 to provide services to the users. The processing center 134 can be a computer cluster, a data center, a main frame computer, or a server farm. In one implementation, the processing center 134 and data storage 138 are collocated.

Figure 2:
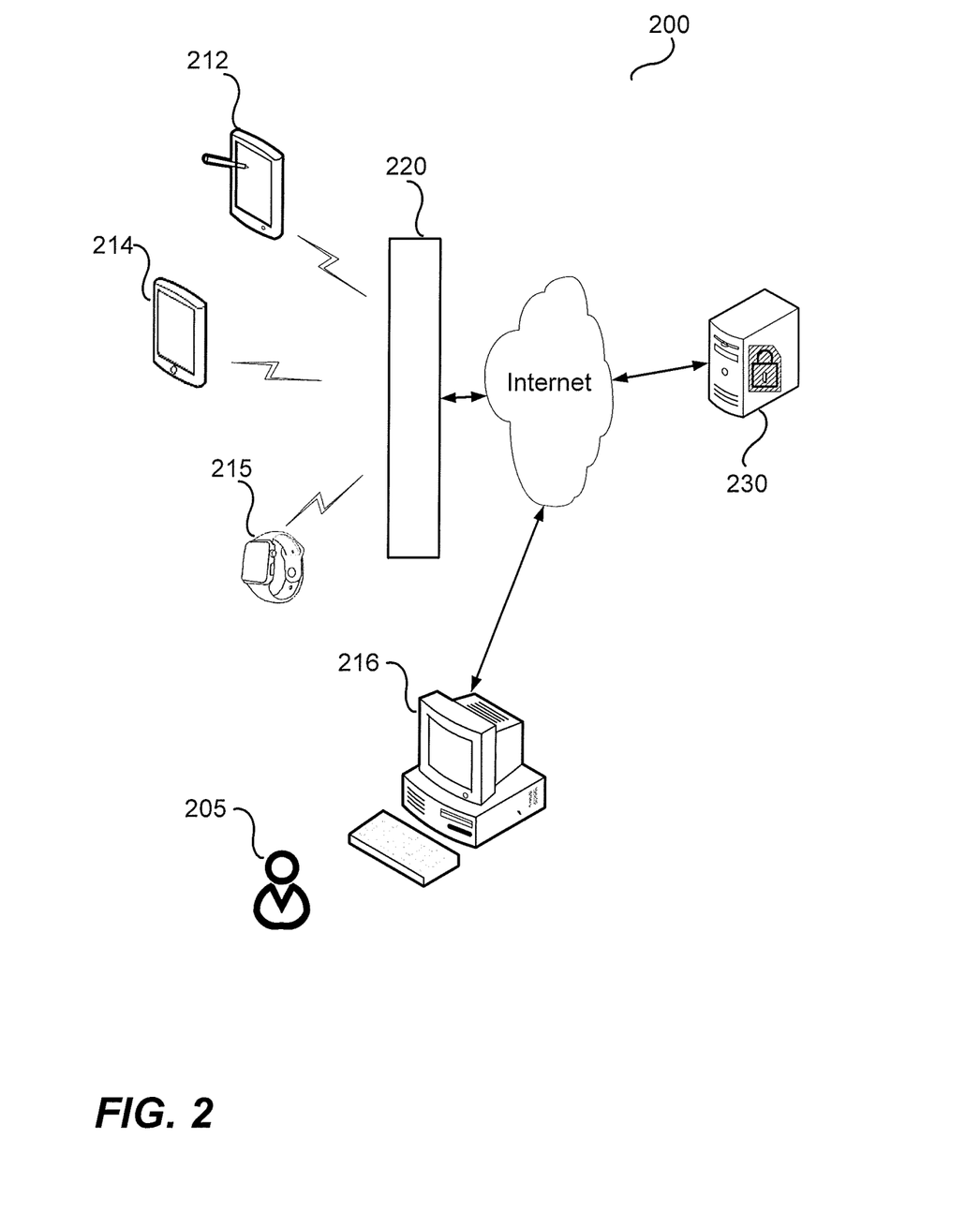
FIG. 2 illustrates a system model of a remote user authentication system.

FIG. 2 illustrates a system model of a remote user authentication system. As shown in FIG. 2, remote authentication system 200 may include the following entities: user 205, registered devices (tablet 212, smartphone 214, and smartwatch 215, and user terminal 216, for example), and service provider 230. The registered devices may be set-up ("registered") during an initial session with service provider 230. Tablet 212, smartphone 214, and smartwatch 215 may connect through a mobile network and/or mobile service provider 220 to the Internet. User terminal 216, and service provider 230 may connect, either directly or through an intervening wired or wireless network, to the Internet. User 205 may be, for example, a bank customer with typical human limitations, such as not being able to remember many long passwords, or perform complex cryptographic computations. Registered devices (tablet 212, smartphone 214, and smartwatch 215, and user terminal 216, for example) are electronic devices that may be able to collaborate and perform complex cryptographic operations. User 205 may be required to register at least two mobile and/or fixed devices with service provider 230 in order to receive services (access a bank account, for example). A legitimate user may expect to be able to get services from service provider 230 without providing a static username and/or password. One of the registered devices (tablet 212, smartphone 214, and smartwatch 215, for example) may serve as a gateway device. The gateway device may be used to manage the user end of the secure login process as described in more detail below.

User terminal 216 may be an electronic device such as a laptop or desktop personal computer, and may be used to log in to service provider 230 to view or perform, for example, banking transactions. Service provider 230 may include a stand-alone server (computer) or group of servers, or be part of a cloud computing infrastructure such as that described above with respect to FIG. 1. Service provider 230 may also include a hardware security module that safeguards private (cryptographic) keys and provides cryptoprocessing. Service provider 230 may also distribute cryptographic keys and verification codes to clients of its services.

Figure 3:
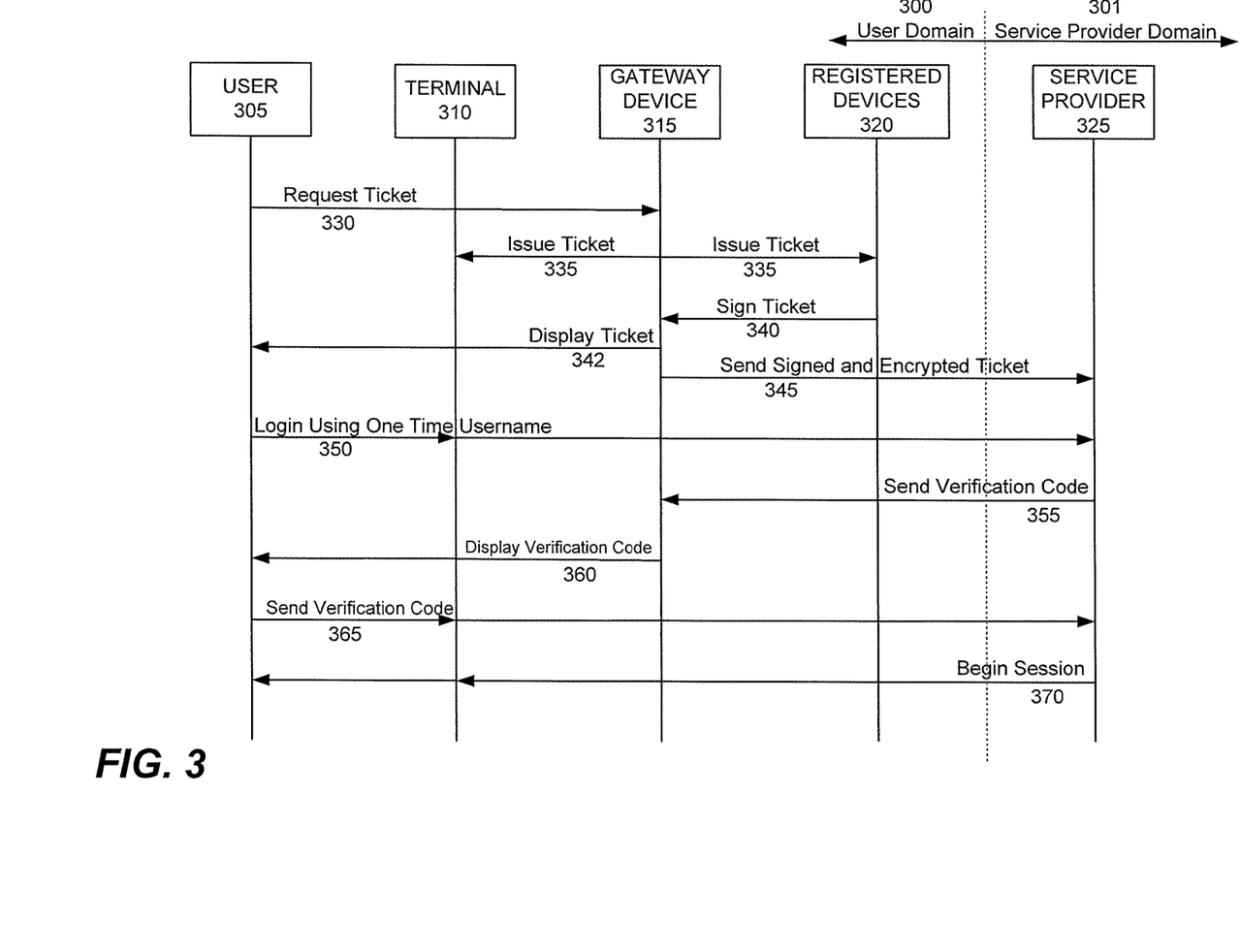
FIG. 3 illustrates a series of transactions according to some embodiments of a remote user authentication scheme.

FIG. 3 illustrates a series of transactions according to some embodiments of a remote user authentication scheme. In FIG. 3, the entities to the left of the dotted line may be part of the user domain 300, and the entities to the right of the dotted line may be part of the service provider domain 301. The user domain entities may include user 305, terminal 310, gateway device 315, and other registered devices 320. In service provider domain 301, the identified entity may be service provider 325. It should be noted that the entities identified in FIG. 3 are exemplary functional roles and are not intended to represent a strict system architecture or structure. For example, a single smartphone may act as terminal 310, gateway device 315, and one of the registered devices.

In FIG. 3, time progresses from top to bottom, and the transactions shown illustrate an example login and user authentication process according to some embodiments of the present disclosure. A user 305 may begin the process of establishing a session with service provider 325 by requesting a ticket 330 through gateway device 315, whereupon gateway device 315 may issue a ticket 335 to other registered devices 320, and terminal 310.

The ticket issued by gateway device 315 may be used to initiate a session between user 305 and service provider 325. The ticket may also be used to provide various identity and security parameters for the session between user 305 and service provider 325. The ticket may further be used by service provider 325 to authenticate user 305. The ticket may include, but is not limited to, the following parameters:

1) One-Time Username: The dynamic One-Time Username (OTU) may be used by a user for a specific session login after service provider 325 verifies the user ticket and authenticates the user. The One-Time Username may, for example, consist of 8 characters, including capital letters, small letters, numbers, and special characters. The one-time username may be generated randomly by gateway device 315 or may be selected from a list.

2) Session Key: A session key (k) may be a randomly generated symmetric cryptographic key used during one or more subsequent transactions to ensure the security of a verification code sent by service provider 325. Gateway device 315 may generate a session key for each login session.

3) Ticket Validity Period: The Ticket Validity Period (TVP) may be used as a security parameter that limits the lifespan of a ticket to reduce the likelihood of session hijacking. This may give the user the ability to specify the Ticket Validity Period (5, 6, or 7 minutes, for example). A service provider 325 may also set a maximum lifespan for tickets.

4) Timestamp: A timestamp (T) may be used to indicate the time at which gateway device 315 issues a ticket. The timestamp may be presented in a standard time format (ISO 8601, for example). The timestamp may be used, along with the Ticket Validity Period, to determine the exact expiration time of a ticket.

5) Access Control List: The user may specify an access control list (ACL), which may provide a list of permissions associated with a specific ticket. For example, in some embodiments, at least two permission modes may be used. In a first permission mode (active mode permission), a user may be permitted to have full control and perform all actions during a particular session. In a second permission mode (passive mode permission) a user may be restricted to only viewing information (financial transactions, for example, when the service provider 325 is a financial institution), but not to perform any active operations or make changes to the user's account. The access control list may provide a user-centric access control model that may provide additional engagement for users in the setting of ticket permission. The access control list may provide better security by using the principle of least privilege. Using this principle may give a user account only those privileges which are essential to that user's work at a particular point in time. However, this capability may increase user overhead and may require training.

A ticket may have additional parameters that may be necessary for certain service providers. The foregoing list is exemplary and not intended to be exhaustive.

Referring again to FIG. 3, after gateway device 315 issues ticket 335, two or more of the user's registered devices (gateway device 315, and other registered devices 320) may be coordinated to sign ticket 340. The signing of a ticket, described in detail below, may permit service provider 325 to verify the identity of user 305. By requiring that two or more devices sign the ticket, the security of the user authentication process may be enhanced over traditional authentication schemes, since the loss or theft of a single device would not allow a criminal to establish a session with service provider 325.

Once the ticket is signed, gateway device 315 may encrypt the ticket (using a public key—explained more fully below—from service provider 325, for example) and send the signed and encrypted ticket 345 to service provider 325. The ticket may also be shown to the user 342 to allow the user to employ the dynamic One-Time Username to login 350 to service provider 325 (within the time limit established by the Ticket Validity Period).

After service provider 325 has received and validated the ticked (decoded the ticket and checked the validity of the signature), it may then send a verification code 355 to gateway device 315. The verification code may be encrypted using the session key k provided in the ticket. The verification code may be decrypted by gateway device 315 and then shown 360 to user 305. The user may then enter the verification code 365 to service provider 325 through terminal 310. Once the correct verification code is received by service provider 325, a session may begin 370.

Figure 4A:
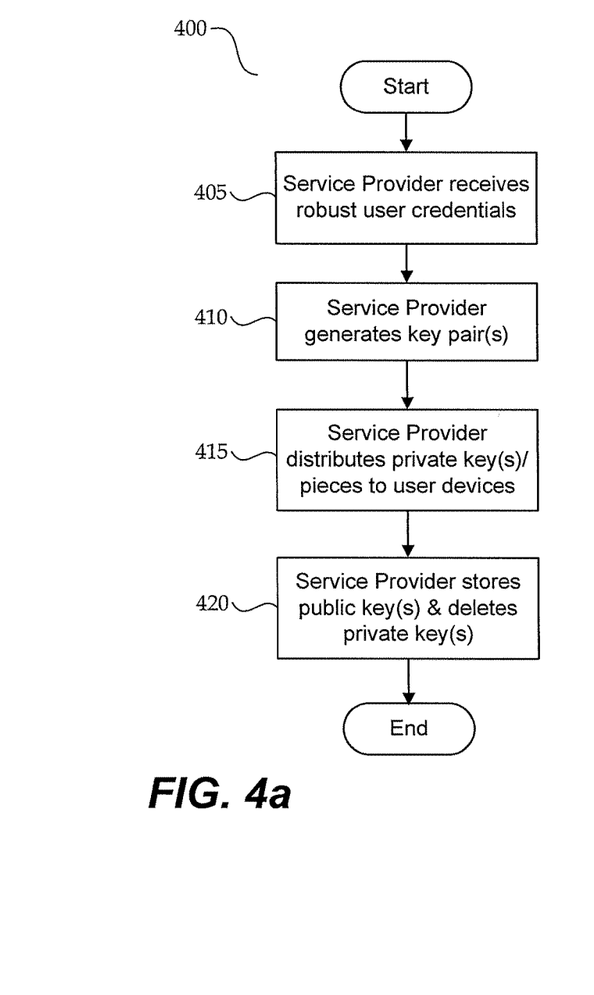
FIG. 4a illustrates an example flow diagram for a process that may be used for registering a user with a service provider for the first time.
Figure 4B:
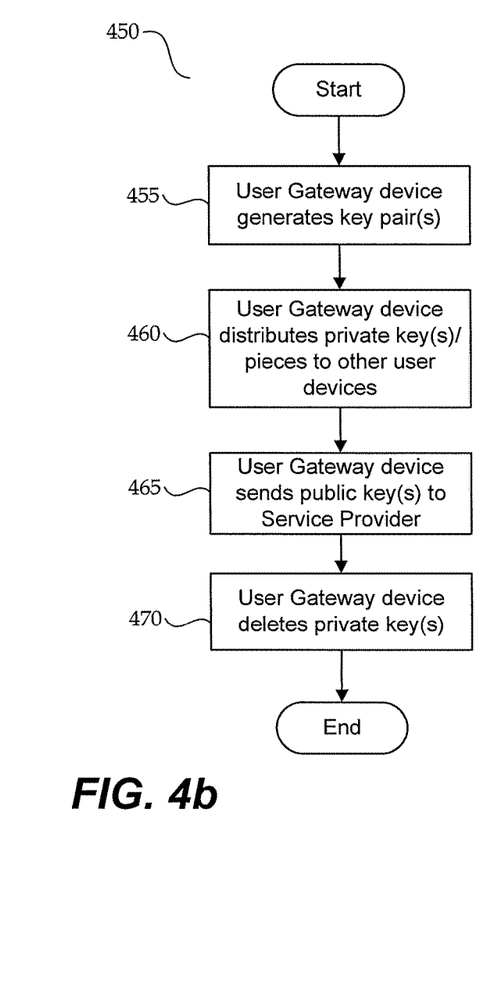
FIG. 4b illustrates another example flow diagram for a process that may be used for registering a user with a service provider for the first time.

FIGS. 4a and 4b illustrate example flow diagrams for processes that may be used for registering a user with a service provider for the first time. Referring to FIG. 4a, in step 405 of registration process 400, a service provider receives robust credentials from a user. The user may already have an established relationship with the service provider (for example, the user may be a customer of a "bricks and mortar" bank) but may wish to begin using online services offered by the service provider. Robust credentials may be specific information known primarily by the user and the service provider (PIN number, account number, Social Security number, mother's maiden name, or the like). The robust credentials may be used by the service provider to initially authenticate the user. If the user has no prior relationship with the service provider, then the robust credentials may be established, for example, using a credit report for the user. The service provider may ask multiple choice questions based on information on the credit report to authenticate the user. Other robust credentials, known to those skilled in the art, may also be used.

Once the service provider has authenticated the user, then, in step 410, the service provider generates one or more key pairs. The key pairs may be associated with a public key encryption system that may be used to encrypt, decrypt, sign, and verify information, such as login session tickets. Public key encryption systems are well known in the art of cryptography. In a public key encryption system, such as RSA, ElGamal, ECC and the like, a key pair may be generated—a public key and a private key—wherein the public key may be distributed publicly and used to encrypt (or, in some cases, decrypt) data and the private key may be held in secret and used to decrypt (or, in some cases, encrypt) a message. Using one of the well-established public key cryptosystems with sufficiently long keys may ensure that a particular private key may not be computed from the associated public key.

A message may also be "signed" by a user (for example, to allow a service provider to authenticate the user) by first encrypting a message with the user's private key before encrypting the first encrypted message with the service provider's public key. The service provider may then decrypt the message with its own private key and then decrypt the enclosed message with the user's public key. If the resulting message is as expected, the service provider may be assured that the message was indeed sent by the user.

Private keys may also be distributed or shared among a number of users or among several of a user's registered devices by methods known in the art. For example, Shamir (Shamir, A., "How to Share a Secret," *Communications of the ACM*, Volume 22 Issue 11, pp. 612-613, November 1979, incorporated herein by reference) describes a method for dividing data (a private key, for example) into n pieces such that the data can be reconstructed from any k pieces (where k≤n), but not from fewer than k pieces. This is known in the art as a (k, n) threshold scheme (or threshold cryptosystem) for secret sharing. When used to split a key for use in authentication, such a scheme may be referred to as a "threshold signature" scheme. Using the method of Shamir, (based on polynomial interpolation), a service provider or device may divide a private key d into n pieces $d_i (i \in [1, n])$, where k pieces would be required to reconstruct the private key d. This may be accomplished by first picking a random k−1 degree polynomial.

$$q(x) = a_0 x + a_1 x + \ldots + a_{k-1} x^{k-1} \quad (1)$$

where $a_0 = d$ (the private key), and calculate the n pieces as: $d_1 = q(1), \ldots, d_i = q(i), \ldots, d_n = q(n)$.

Given any subset of k of the $d_i$ values (together with their identifying indices), service provider or device may determine the coefficients of q(x) by polynomial interpolation (using Lagrange polynomials, for example). Private key d may then be calculated as: d=q(0). The process may use modular arithmetic (modulo a prime number p), where p is chosen to be larger than both d and n. The coefficients $a_1, \ldots, a_{k-1}$ in q(x) may be randomly chosen from the integers in the range [0, p) with a uniform distribution, and the values $d_1, \ldots, d_n$ may be computed modulo p.

In step 410, the service provider may generate a key pair to be associated with each of the user's registered devices. In some embodiments, the service provider may split a single private key into a number of pieces using a threshold scheme as described above.

In step 415, the service provider may distribute private keys to each registered device or the service provider may split a single private key into a number of pieces where each piece may be distributed to one of the user's registered devices. As part of this step, the service provider may also distribute a public key ($E_{pk}$) for use by a device (gateway, for example) to encrypt a ticket that is to be sent to the service provider.

In step 420 of registration process 400, the service provider may store the public key(s) for the user's registered devices and may delete the private keys (so it may not be found by a hacker, for example).

At this point, the registered user may proceed to use the login process to be discussed in detail below.

FIG. 4b illustrates an alternative example flow diagram for a process that may be used for registering a user with a service provider for the first time. Referring to FIG. 4b, in step 455 of registration process 450, a user may instruct his gateway device to generate a key pair to be associated with each of the user's registered devices. In some embodiments, the gateway device may split a single private key into a number of pieces using a threshold scheme (as described above).

In step 460, the gateway device may distribute private keys to each registered device or the gateway device may split a single private key into a number of pieces, using, for example, a threshold scheme (as described above), where each piece may be distributed to one of the user's registered devices.

In step 465, the gateway device may send the public key(s) to the service provider. As part of step 465, the user may also be required to provide robust credentials, as described above, to allow the service provider to authenticate the user. Also as part of this step, the gateway device may receive a service provider's public key ($E_{pk}$) for use by a device (gateway device, for example) to encrypt a ticket that is to be sent to the service provider.

In step 470 of registration process 450, the user's gateway device may delete the private key(s).

At this point, the registered user may proceed to use the login process to be discussed in detail below.

Figure 5:
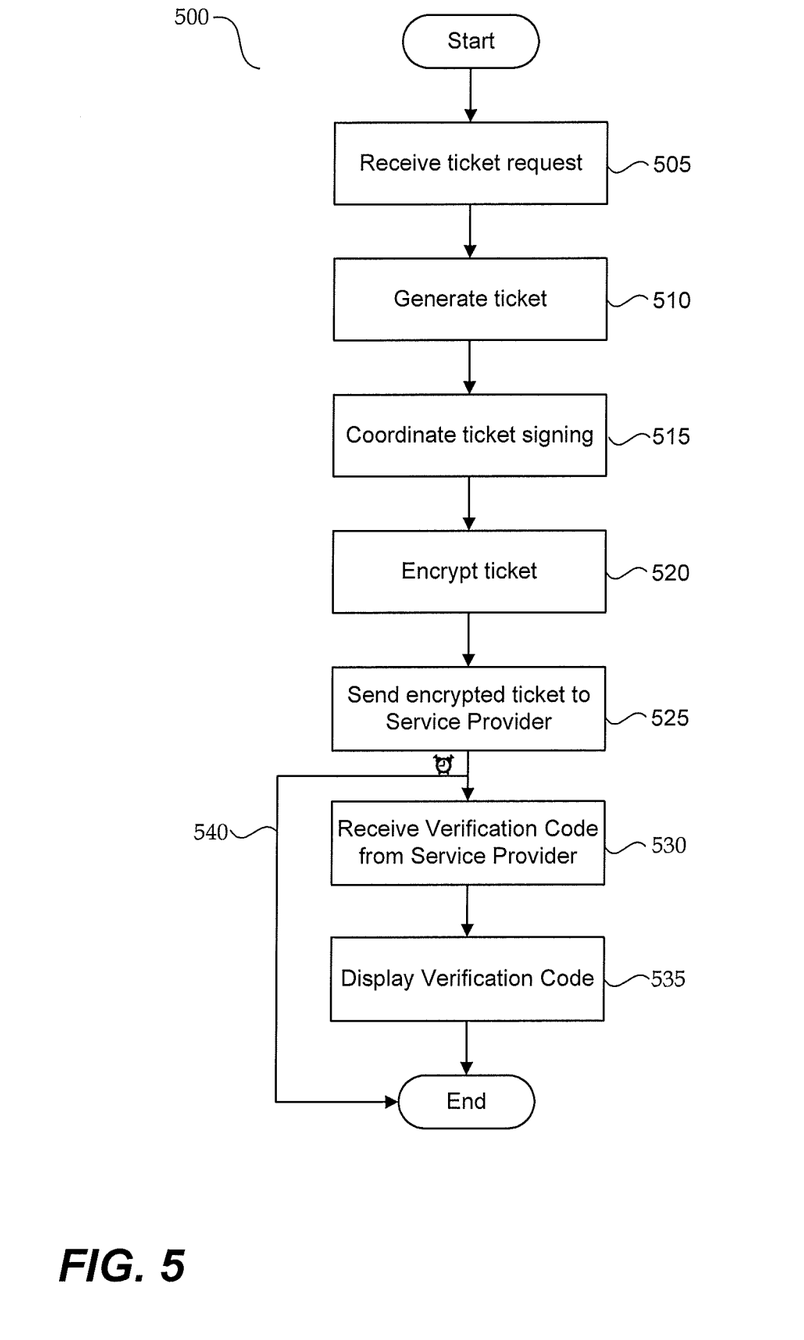
FIG. 5 illustrates a flow diagram of an exemplary login process from the perspective of a gateway device.

FIG. 5 illustrates a flow diagram of an exemplary login process 500 from the perspective of a gateway device. In step 505 of gateway device process 500, circuitry in the gateway device may receive a ticket request.

In step 510, circuitry in the gateway device may generate a ticket. The ticket, as described in detail above, may include a dynamic one-time username (OTU), a session key k, ticket validity period (TVP), timestamp (T), and access control list (ACL). The ticket (M) may be specified in concise form as follows:

$$M = OTU, k, TVP, T, ACL \quad (2)$$

In step 515, circuitry in the gateway device may coordinate signing of the ticket. In some embodiments, the ticket may be signed by circuitry in two or more registered devices (including the gateway device) using a threshold scheme. In order to generate the signature σ for message M, circuitry in each registered device may generate a signature share $\sigma_i$ (a partial signature) as follows:

$$\sigma_i = H(M)^{d_i} \quad (3)$$

where $\sigma_i$ is a share of the signature, M is the ticket, H(M) is a cryptographic hash (for example SHA-2, SHA-3, or the like) of the ticket, and $d_i$ represents the associated private key piece. The index i in this and other formulas herein may represent the $i^{th}$ registered device, where there may be as many as n registered devices. As discussed above, a service provider may require at least two registered devices to sign a ticket. If a user registers more than two devices in this case, then, for example, a (2, n) threshold scheme may be used.

Circuitry in the gateway device may generate a first partial signature and collect each of the additional partial signatures and compute the complete signature σ as:

$$\sigma = \Pi_{j \geq t} \sigma_i^{\Pi_{i \in [1,n], i \neq j} \frac{0 - x_i}{x_j - x_i}} \quad (4)$$

where $\sigma_i$ is the $i^{th}$ share of the signature.

In step 520, circuitry in the gateway device may encrypt the ticket M, along with the signature σ using the service provider's public key ($E_{pk}$) as:

$$C = E_{pk}(OTU\|k\|TVP\|T\|ACL\|\sigma) \quad (5)$$

where C is the encrypted ticket and signature.

In step 525, circuitry in the gateway device may send the encrypted ticket and signature to the service provider. After sending the encrypted ticket and signature to the service provider, circuitry in the gateway device may wait for a predetermined time-out period. If within the predetermined time-out period, the circuitry in the gateway device receives a verification code from the service provider in step 530, then circuitry in the gateway device may display the verification code 535. Otherwise, if the time-out expires before receiving a verification code (540), the login process may terminate.

Figure 6:
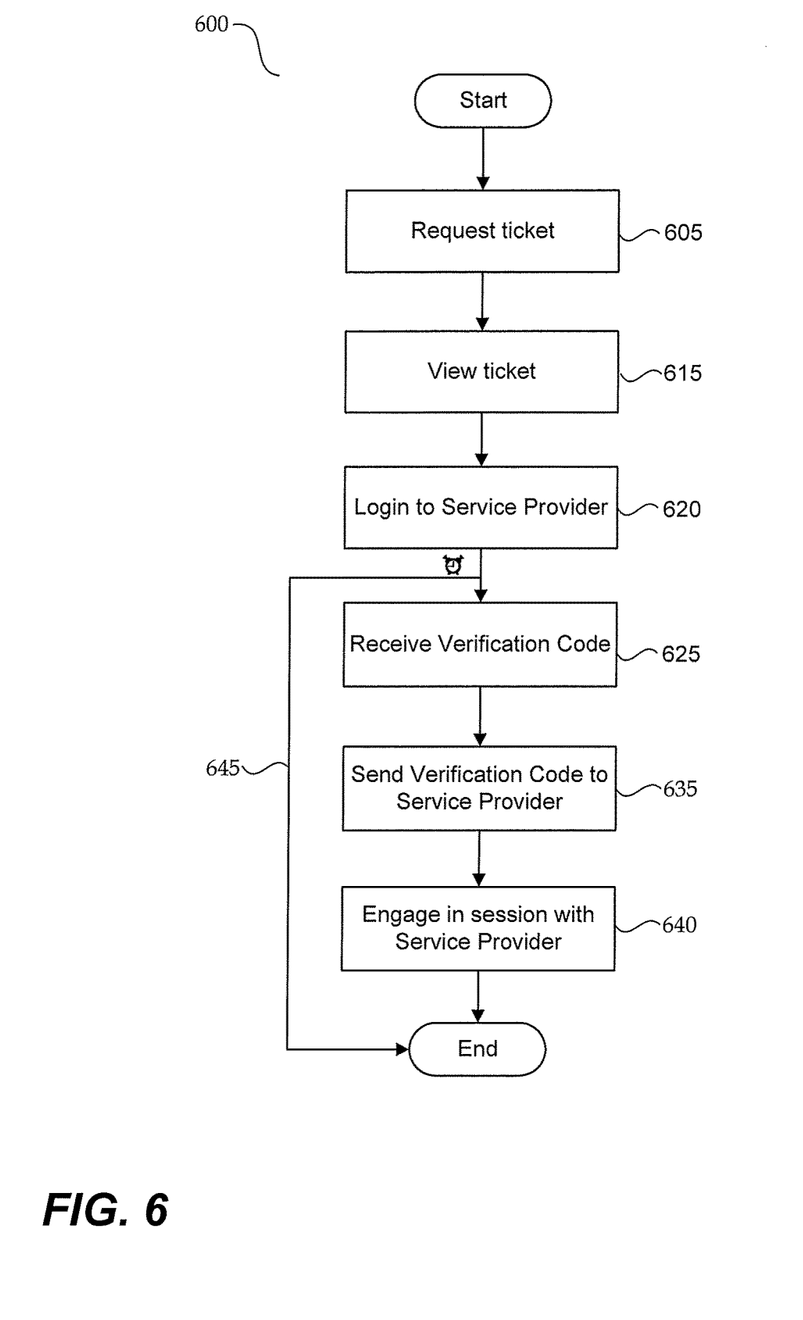
FIG. 6 illustrates a flow diagram of an exemplary login process from the perspective of a user terminal.

FIG. 6 illustrates a flow diagram of an exemplary login process 600 from the perspective of a user. In step 605 of login process 600, a ticket request may be made to the circuitry in the gateway device.

In step 615, circuitry in the gateway device may display the ticket (on a display screen, for example). The user may need information from the ticket such as the one-time username (OTU), ticket validity period (TVP), and access control list (ACL).

In step 620, circuitry in the user terminal may facilitate a user login to the service provider. If within a predetermined time-out period, circuitry in the gateway device receives a verification code, then circuitry in the gateway device may display the verification code (on a display screen, for example) in step 625. The user may then enter the verification code into the user terminal and the user terminal may send the verification code to the service provider in step 635. The user may then begin engaging in a session with the service provider using circuitry in the user terminal in step 640. Otherwise, if the time-out expires before receiving a verification code (645), the login process may terminate.

Figure 7:
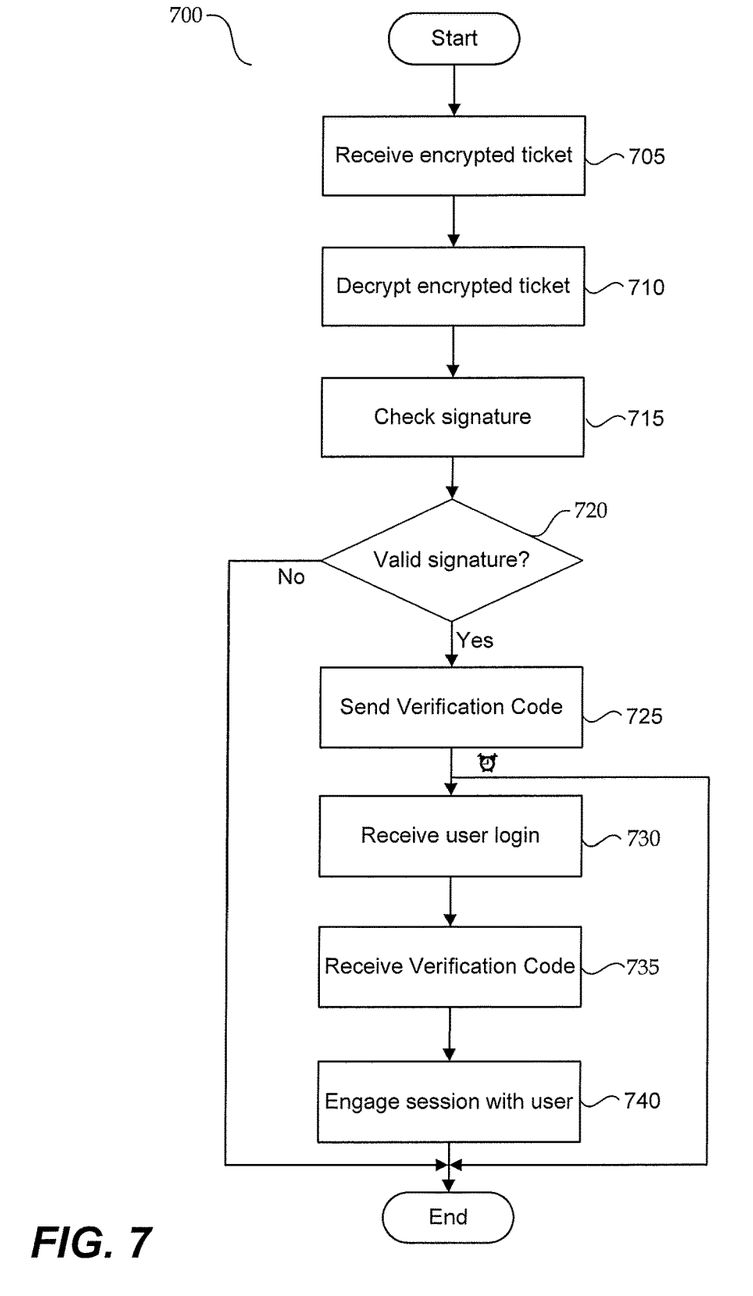
FIG. 7 illustrates a flow diagram of an exemplary login process from the perspective of a service provider.

FIG. 7 illustrates a flow diagram of an exemplary login process 700 from the perspective of a service provider. In step 705 of the service provider login process 700, circuitry in the service provider may receive a ticket from a user gateway.

In step 710, circuitry in the service provider decrypts the ticket using its private key.

In step 715, circuitry in the service provider may check the signature provided with the ticket. This may be done by first computing H(M) using the same cryptographic hash function used by the gateway. Then, circuitry in the service provider may use the public key of the user requesting authentication to decrypt the signature σ. The decrypted signature may then be compared to the calculated H(M) in step 720. If the two are identical, then the signature is valid and the process continues to step 725, otherwise, the signature is invalid and the login process may terminate.

In step 725, circuitry in the service provider may send a verification code to the gateway device. The verification code may be encrypted by circuitry in the service provider using the session key k provided in the ticket. At this point, circuitry in the service provider service provider may wait for a time-out period based on the ticket validity period (TVP) and timestamp (T) provided in the ticket. If within the time-out period, the circuitry in the service provider service provider does not receive a login in step 730 and a valid verification code in step 735 from the user, then the circuitry in the service provider service provider may terminate the login process.

In step 740, circuitry in the service provider service provider engages in a session with the user.

Figure 8:
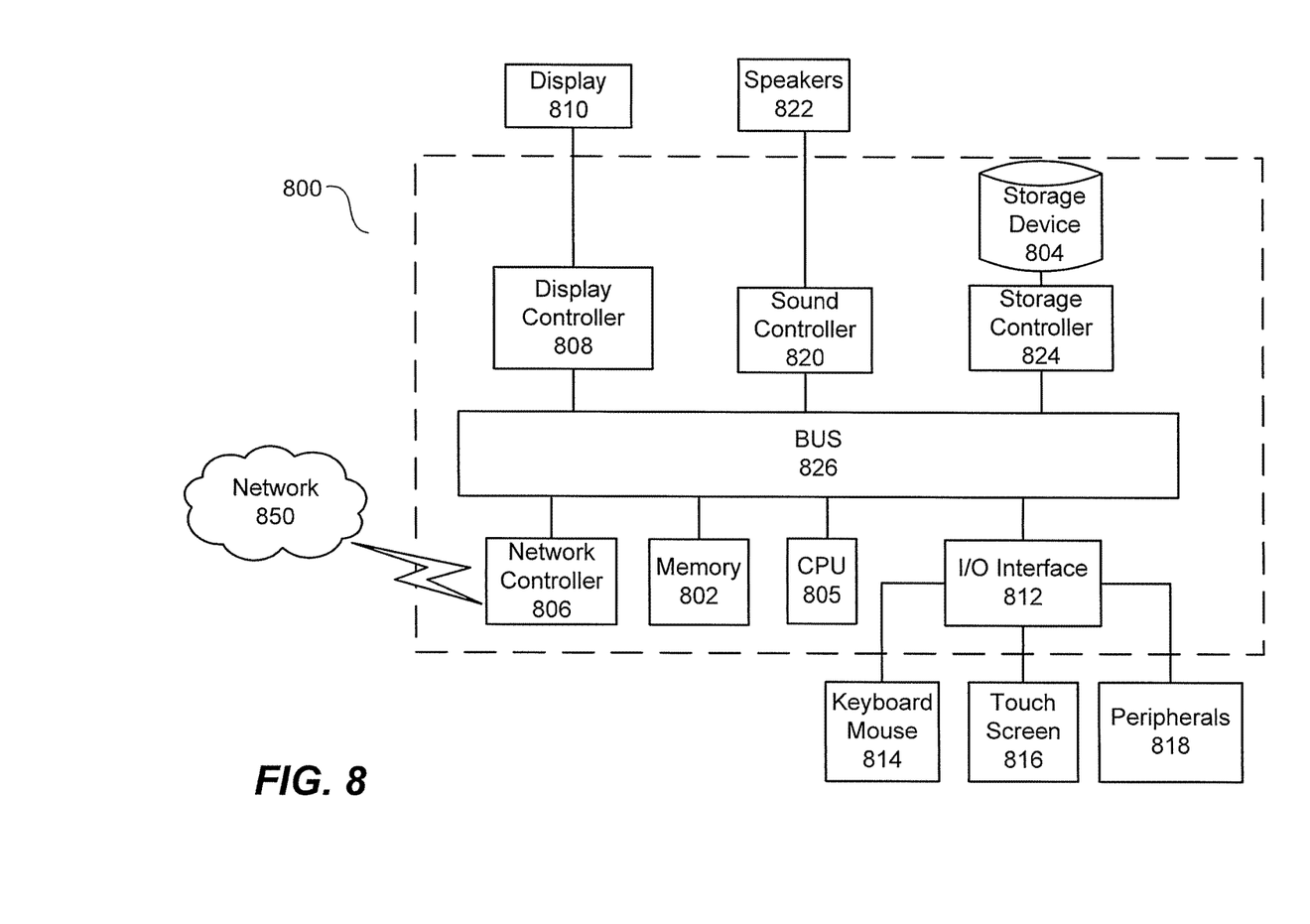
FIG. 8 illustrates a functional hardware diagram of a computer, according to exemplary embodiments.

FIG. 8 is a hardware description of a computer, according to exemplary embodiments. While computer 800 illustrated in FIG. 8 may illustrate a number of generic components, all of the computers, devices, and servers illustrated in FIGS. 1 and 2 (for example, tablet 212, smartphone 214, and smartwatch 215, and user terminal 216, and service provider 230) include most components illustrated in FIG. 8. In FIG. 8, computer 800 includes a CPU 805 which may include one or more processor cores that, in turn, include circuitry that may perform the processes described herein. Data and instructions may be stored in memory 802 for high-speed access to CPU 805 during active processing. Data and instructions may also be stored on a storage device 804 such as a hard disk drive (HDD), a solid state drive (SSD), flash memory, or portable storage medium. Data and instructions may also be stored remotely and downloaded as needed. Further, the claimed advancements are not limited by the form of the non-transitory computer-readable media on which the instructions of the inventive processed are stored. For example, the instructions may be stored on CDs, DVDs, in FLASH memory, RAM, ROM, PROM, EPROM, EEPROM, hard disk or any other information processing device with which computer 800 communicates, such as a server or other computer.

Further, the claimed advancements may be provided as a utility application, background daemon, or component of an operating system, or combination thereof, executing in conjunction with CPU 805 and an operating system such as Microsoft Windows, UNIX, Solaris, LINUX, Apple Mac-OS, iOS, Android, and other systems known to those skilled in the art.

The hardware elements, in order to achieve computer 800 of FIG. 8, may be realized by various circuitry elements, known to those skilled in the art. For example, CPU 805 may be a Pentium®, Xeon® or Core™ processor from Intel® Corporation, an Athlon™, Opteron™, or Phenom™ processor from AMD, any of the many embedded ARM processors, or may be another processor type that would be recognized by one of ordinary skill in the art. Alternatively, the CPU 805 may be implemented on an SOC, FPGA, ASIC, PLD or using discrete logic circuits, as one of ordinary skill in the art would recognize. Further, CPU 805 may be implemented as multiple processors cooperatively working in parallel to perform the instructions of the inventive processes described above.

Computer 800 in FIG. 8 may also include a network controller 806, such as an Intel Ethernet PRO network interface card from Intel® Corporation, for interfacing with network 850. As can be appreciated, the network 850 can be a public network, such as the Internet, or a private network such as an LAN or WAN network, or any combination thereof and can also include PSTN or ISDN sub-networks. The network 850 can also be wired, such as an Ethernet network, or can be wireless such as a cellular network including EDGE, 3G, 4G, or LTE cellular systems. The wireless network can also be WiFi, Bluetooth, or any other wireless form of communication that is known.

Computer 800 may further include a display controller 808, such as a NVIDIA GeForce GTX or Quadro graphics adaptor from NVIDIA Corporation for interfacing with display 810, such as a Hewlett Packard HPL2445w LCD monitor. A general purpose I/O interface 812 may also be included in interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 may also be provided in computer 800, such as a Sound Blaster X-Fi Titanium from Creative, to interface with speakers/microphone 822 thereby providing sounds and/or music.

A general purpose storage controller 824 may be used to connect the storage device 804 with bus 826, which may be an ISA, EISA, VESA, PCI, PCI Express, or similar, for interconnecting all of the components of computer 800. A description of the general features and functionality of the display 810, keyboard and/or mouse 814, as well as the display controller 808, storage controller 824, network controller 806, sound controller 820, and general purpose I/O interface 812 is omitted herein for brevity as these features are known in the art.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chip or chipset, as shown on FIG. 9.

Figure 9:
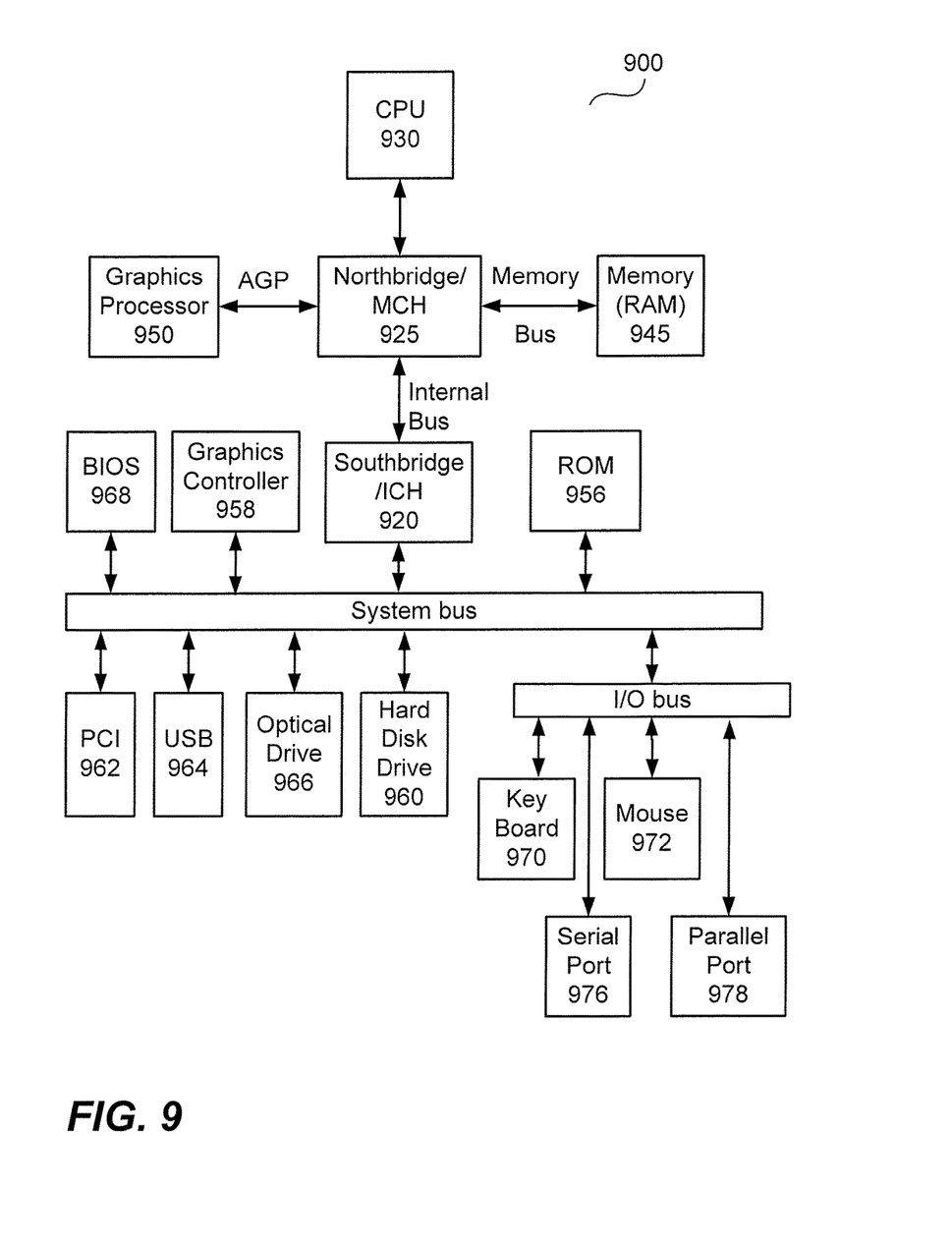
FIG. 9 illustrates a schematic diagram of a data processing system, according to some embodiments.

FIG. 9 shows a schematic diagram of a data processing system, according to some embodiments, for performing authentication. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

According to certain implementations, the instruction set architecture of the CPU 930 may use a reduced instruction set architecture (RISC), a complex instruction set architecture (CISC), a vector processor architecture, a very large instruction word architecture. Furthermore, the CPU 930 may be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 977 through a PCI bus 962.

The PCI devices may include, for example, Ethernet adapters, add-in cards, and PC cards for notebook computers. The hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bust through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smartphones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The systems and methods disclosed above enhance and improve the operations of the various components of an online system for delivering services such as financial, retail, social media and the like by providing a more secure and easy-to-use alternative to the conventional username and password scheme. This allows a user to engage with numerous service providers without the need to remember a large number of usernames and complex passwords. The disclosed systems and methods also reduce the likelihood of compromised credentials in the event of a data breach.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

Obviously, numerous modifications and variations of the present disclosure are possible in light of the above teachings. It is therefore to be understood that within the scope of the appended claims, the embodiments herein may be practiced otherwise than as specifically described herein.

The invention claimed is:

1. A first device for authenticating a user for access to a service provider over a network comprising:
   circuitry configured to:
      receive a request for a ticket;
      generate the ticket, wherein the ticket includes a one-time username;
      send the ticket to at least one additional device;
      generate a first partial signature of the ticket;
      receive at least one additional partial signature of the ticket from each of the at least one additional device;
      generate a complete signature of the ticket based on the first partial signature and the at least one additional partial signature of the ticket;
      encrypt the ticket and the complete signature of the ticket;
      send the encrypted ticket and encrypted complete signature of the ticket to the service provider;
      receive an encrypted verification code from the service provider;
      decrypt the encrypted verification code; and
      display the decrypted verification code.

2. The first device of claim 1, wherein the ticket further includes a session key for use in decrypting the encrypted verification code.

3. The first device of claim 2, wherein the ticket further includes a ticket validity period that establishes a time limit for a user login.

4. The first device of claim 3, wherein the ticket further includes an access control list that provides at least two permission modes for the user login.

5. The first device of claim 1, wherein the complete signature of the ticket is calculated via polynomial interpolation from the first partial signature and the at least one additional partial signature of the ticket.

6. The first device of claim 1, wherein the first device is a smartphone.

7. The first device of claim 6, wherein one of the at least one additional devices is a smartwatch.

8. The first device of claim 6, wherein one of the at least one additional devices is a tablet.

9. A method for authenticating a user for access to a service provider over a network comprising:
   receiving, at a first device, a ticket request;
   generating, by the first device, a ticket, wherein the ticket includes a one-time user name;
   sending, from the first device, the ticket to at least one additional device;
   generating a first partial signature of the ticket;
   receiving at least one additional partial signature of the ticket from each of the at least one additional device;
   generating a complete signature of the ticket based on the first partial signature and the at least one additional partial signature of the ticket;
   encrypting the ticket and the complete signature of the ticket;
   sending the encrypted ticket and encrypted complete signature of the ticket to the service provider;
   receiving, at the gateway device, an encrypted verification code from the service provider;
   decrypting the encrypted verification code; and
   displaying the decrypted verification code.

10. The method of claim 9, wherein the ticket further includes a session key for use in decrypting the encrypted verification code.

11. The method of claim 10, wherein the ticket further includes a ticket validity period that establishes a time limit for a user login.

12. The apparatus of claim 11, wherein the ticket further includes an access control list that provides at least two permission modes for a user login.

13. The apparatus of claim 9, wherein the complete signature of the ticket is calculated via polynomial interpolation from the first partial signature and the at least one additional partial signature of the ticket.

14. The apparatus of claim 9, wherein the first device is a smartphone.

15. The apparatus of claim 14, wherein one of the at least one additional devices is a smartwatch.

16. The apparatus of claim 14, wherein one of the at least one additional devices is a tablet.

17. A non-transitory computer-readable medium storing a program which when executed by a computer, causes the computer to perform a method for authenticating a user for access to a service provider over a network, the method comprising:
   receiving a ticket request;
   generating a ticket, wherein the ticket includes a one-time user name;
   sending the ticket to at least one device;
   generating a first partial signature of the ticket;
   receiving at least one additional partial signature of the ticket from each of the at least one device;
   generating a complete signature of the ticket based on the first partial signature and the at least one additional partial signature of the ticket;
   encrypting the ticket and the complete signature of the ticket;
   sending the encrypted ticket and encrypted complete signature of the ticket to the service provider;
   receiving an encrypted verification code from the service provider;
   decrypting the encrypted verification code; and
   displaying the decrypted verification code.

18. The non-transitory computer-readable medium of claim 17, wherein the computer is a component of a smartphone.

19. The non-transitory computer-readable medium of claim 18, wherein one of the at least one devices is a smartwatch.

20. The non-transitory computer-readable medium of claim 18, wherein one of the at least one devices is a tablet.

* * * * *